(12) United States Patent
Raichelgauz et al.

(10) Patent No.: US 10,360,253 B2
(45) Date of Patent: Jul. 23, 2019

(54) SYSTEMS AND METHODS FOR GENERATION OF SEARCHABLE STRUCTURES RESPECTIVE OF MULTIMEDIA DATA CONTENT

(71) Applicant: Cortica, Ltd., Tel Aviv (IL)

(72) Inventors: Igal Raichelgauz, New York, NY (US); Karina Odinaev, New York, NY (US); Yehoshua Y Zeevi, Haifa (IL)

( * ) Notice: Subject to any disclaimer, the term of this patent is extended or adjusted under 35 U.S.C. 154(b) by 316 days.

(21) Appl. No.: 15/416,415

(22) Filed: Jan. 26, 2017

(65) Prior Publication Data
US 2017/0139940 A1    May 18, 2017

Related U.S. Application Data

(63) Continuation of application No. 14/509,558, filed on Oct. 8, 2014, now Pat. No. 9,575,969, which is a (Continued)

(30) Foreign Application Priority Data

Oct. 26, 2005 (IL) .......................................... 171577
Jan. 29, 2006 (IL) .......................................... 173409
Aug. 21, 2007 (IL) .......................................... 185414

(51) Int. Cl.
*G06F 17/00* (2019.01)
*G06F 16/41* (2019.01)

(52) U.S. Cl.
CPC ..................................... *G06F 16/41* (2019.01)

(58) Field of Classification Search
CPC ........ G06F 16/41; G06F 16/285; G06F 16/43; G06F 16/152; G06F 16/951; G06F 16/14; G06F 17/00
See application file for complete search history.

(56) References Cited

U.S. PATENT DOCUMENTS 4,733,353 A    3/1988  Jaswa
4,932,645 A    6/1990  Schorey et al.
(Continued)

FOREIGN PATENT DOCUMENTS

WO           0231764        4/2002
WO      2003005242 A1       1/2003
(Continued)

OTHER PUBLICATIONS

Johnson, John L., "Pulse-Coupled Neural Nets: Translation, Rotation, Scale, Distortion, and Intensity Signal Invariance for Images." Applied Optics, vol. 33, No. 26, 1994, pp. 6239-6253.
(Continued)

*Primary Examiner* — Truong V Vo

(57) ABSTRACT

A system and method for generating concept structures based on a plurality of multimedia data elements (MMDEs). The method includes: generating, based on the plurality of MMDEs, a plurality of patches, wherein each patch is at least a portion of one of the MMDEs; generating, based on the plurality of patches, a plurality of signatures for the plurality of MMDEs; clustering the generated plurality of signatures into a plurality of clusters; generating metadata for each of the plurality of clusters; and creating, based on the plurality of clusters, at least one concept structure, wherein each concept structure includes at least one of the plurality of clusters and the metadata associated with the at least one of the plurality of clusters.

19 Claims, 6 Drawing Sheets

Related U.S. Application Data continuation of application No. 13/602,858, filed on Sep. 4, 2012, now Pat. No. 8,868,619, which is a continuation of application No. 12/603,123, filed on Oct. 21, 2009, now Pat. No. 8,266,185, which is a continuation-in-part of application No. 12/084,150, filed as application No. PCT/IL2006/001235 on Oct. 26, 2006, now Pat. No. 8,655,801, said application No. 12/603,123 is a continuation-in-part of application No. 12/195,863, filed on Aug. 21, 2008, now Pat. No. 8,326,775, which is a continuation-in-part of application No. 12/084,150, said application No. 12/603,123 is a continuation-in-part of application No. 12/348,888, filed on Jan. 5, 2009, which is a continuation-in-part of application No. 12/084,150, and a continuation-in-part of application No. 12/195,863, said application No. 12/603,123 is a continuation-in-part of application No. 12/538,495, filed on Aug. 10, 2009, now Pat. No. 8,312,031, which is a continuation-in-part of application No. 12/084,150, and a continuation-in-part of application No. 12/195,863, and a continuation-in-part of application No. 12/348,888.

(56) References Cited

U.S. PATENT DOCUMENTS

| | | |
|---|---|---|
| 4,972,363 A | 11/1990 | Nguyen et al. |
| 5,307,451 A | 4/1994 | Clark |
| 5,568,181 A | 10/1996 | Greenwood et al. |
| 5,745,678 A | 4/1998 | Herzberg et al. |
| 5,806,061 A | 9/1998 | Chaudhuri et al. |
| 5,852,435 A | 12/1998 | Vigneaux et al. |
| 5,870,754 A | 2/1999 | Dimitrova et al. |
| 5,873,080 A | 2/1999 | Coden et al. |
| 5,887,193 A | 3/1999 | Takahashi et al. |
| 5,940,821 A | 8/1999 | Wical |
| 5,978,754 A | 11/1999 | Kumano |
| 5,987,454 A | 11/1999 | Hobbs |
| 6,038,560 A | 3/2000 | Wical |
| 6,052,481 A | 4/2000 | Grajski et al. |
| 6,076,088 A | 6/2000 | Paik et al. |
| 6,137,911 A | 10/2000 | Zhilyaev |
| 6,144,767 A | 11/2000 | Bottou et al. |
| 6,147,636 A | 11/2000 | Gershenson |
| 6,240,423 B1 | 5/2001 | Hirata |
| 6,243,375 B1 | 6/2001 | Speicher |
| 6,243,713 B1 | 6/2001 | Nelson et al. |
| 6,275,599 B1 | 8/2001 | Adler et al. |
| 6,329,986 B1 | 12/2001 | Cheng |
| 6,363,373 B1 | 3/2002 | Steinkraus |
| 6,411,229 B2 | 6/2002 | Kobayashi |
| 6,422,617 B1 | 7/2002 | Fukumoto et al. |
| 6,493,692 B1 | 12/2002 | Kobayashi et al. |
| 6,493,705 B1 | 12/2002 | Kobayashi et al. |
| 6,507,672 B1 | 1/2003 | Watkins et al. |
| 6,523,022 B1 | 2/2003 | Hobbs |
| 6,523,046 B2 | 2/2003 | Liu et al. |
| 6,524,861 B1 | 2/2003 | Anderson |
| 6,526,400 B1 | 2/2003 | Takata et al. |
| 6,550,018 B1 | 4/2003 | Abonamah et al. |
| 6,560,597 B1 | 5/2003 | Dhillon et al. |
| 6,594,699 B1 | 7/2003 | Sahai et al. |
| 6,601,060 B1 | 7/2003 | Tomaru |
| 6,611,628 B1 | 8/2003 | Sekiguchi et al. |
| 6,611,837 B2 | 8/2003 | Schreiber |
| 6,618,711 B1 | 9/2003 | Ananth |
| 6,643,620 B1 | 11/2003 | Contolini et al. |
| 6,643,643 B1 | 11/2003 | Lee et al. |
| 6,675,159 B1 | 1/2004 | Lin et al. |
| 6,704,725 B1 | 3/2004 | Lee |
| 6,728,706 B2 | 4/2004 | Aggarwal et al. |
| 6,732,149 B1 | 5/2004 | Kephart |
| 6,751,363 B1 | 6/2004 | Natsev et al. |
| 6,754,435 B2 | 6/2004 | Kim |
| 6,763,069 B1 | 7/2004 | Divakaran et al. |
| 6,763,519 B1 | 7/2004 | McColl et al. |
| 6,774,917 B1 | 8/2004 | Foote et al. |
| 6,795,818 B1 | 9/2004 | Lee |
| 6,804,356 B1 | 10/2004 | Krishnamachari |
| 6,819,797 B1 | 11/2004 | Smith et al. |
| 6,836,776 B2 | 12/2004 | Schreiber |
| 6,845,374 B1 | 1/2005 | Oliver et al. |
| 6,901,207 B1 | 5/2005 | Watkins |
| 6,938,025 B1 | 8/2005 | Lulich et al. |
| 6,970,881 B1 | 11/2005 | Mohan et al. |
| 6,978,264 B2 | 12/2005 | Chandrasekar et al. |
| 7,006,689 B2 | 2/2006 | Kasutani |
| 7,013,051 B2 | 3/2006 | Sekiguchi et al. |
| 7,043,473 B1 | 5/2006 | Rassool et al. |
| 7,124,149 B2 | 10/2006 | Smith et al. |
| 7,158,681 B2 | 1/2007 | Persiantsev |
| 7,199,798 B1 | 4/2007 | Echigo et al. |
| 7,215,828 B2 | 5/2007 | Luo |
| 7,260,564 B1 | 8/2007 | Lynn et al. |
| 7,277,928 B2 | 10/2007 | Lennon |
| 7,296,012 B2 | 11/2007 | Ohashi |
| 7,302,117 B2 | 11/2007 | Sekiguchi et al. |
| 7,313,805 B1 | 12/2007 | Rosin et al. |
| 7,346,629 B2 | 3/2008 | Kapur et al. |
| 7,392,238 B1 | 6/2008 | Zhou et al. |
| 7,406,459 B2 | 7/2008 | Chen et al. |
| 7,450,740 B2 | 11/2008 | Shah et al. |
| 7,523,102 B2 | 4/2009 | Bjarnestam et al. |
| 7,526,607 B1 | 4/2009 | Singh et al. |
| 7,536,384 B2 | 5/2009 | Venkataraman et al. |
| 7,542,969 B1 | 6/2009 | Rappaport et al. |
| 7,548,910 B1 | 6/2009 | Chu et al. |
| 7,555,477 B2 | 6/2009 | Bayley et al. |
| 7,555,478 B2 | 6/2009 | Bayley et al. |
| 7,562,076 B2 | 7/2009 | Kapur |
| 7,574,436 B2 | 8/2009 | Kapur et al. |
| 7,574,668 B2 | 8/2009 | Nunez et al. |
| 7,577,656 B2 | 8/2009 | Kawai et al. |
| 7,657,100 B2 | 2/2010 | Gokturk et al. |
| 7,660,468 B2 | 2/2010 | Gokturk et al. |
| 7,694,318 B2 | 4/2010 | Eldering et al. |
| 7,836,054 B2 | 11/2010 | Kawai et al. |
| 7,920,894 B2 | 4/2011 | Wyler |
| 7,921,107 B2 | 4/2011 | Chang et al. |
| 7,933,407 B2 | 4/2011 | Keidar et al. |
| 7,974,994 B2 | 7/2011 | Li et al. |
| 7,987,194 B1 | 7/2011 | Walker et al. |
| 7,987,217 B2 | 7/2011 | Long et al. |
| 7,991,715 B2 | 8/2011 | Schiff et al. |
| 8,000,655 B2 | 8/2011 | Wang et al. |
| 8,023,739 B2 | 9/2011 | Hohimer et al. |
| 8,036,893 B2 | 10/2011 | Reich |
| 8,098,934 B2 | 1/2012 | Vincent et al. |
| 8,112,376 B2 | 2/2012 | Raichelgauz et al. |
| 8,266,185 B2 | 9/2012 | Raichelgauz et al. |
| 8,312,031 B2 | 11/2012 | Raichelgauz et al. |
| 8,315,442 B2 | 11/2012 | Gokturk et al. |
| 8,326,775 B2 | 12/2012 | Raichelgauz et al. |
| 8,345,982 B2 | 1/2013 | Gokturk et al. |
| 8,548,828 B1 | 10/2013 | Longmire |
| 8,655,801 B2 | 2/2014 | Raichelgauz et al. |
| 8,677,377 B2 | 3/2014 | Cheyer et al. |
| 8,682,667 B2 | 3/2014 | Haughay |
| 8,688,446 B2 | 4/2014 | Yanagihara |
| 8,706,503 B2 | 4/2014 | Cheyer et al. |
| 8,775,442 B2 | 7/2014 | Moore et al. |
| 8,799,195 B2 | 8/2014 | Raichelgauz et al. |
| 8,799,196 B2 | 8/2014 | Raichelquaz et al. |
| 8,818,916 B2 | 8/2014 | Raichelgauz et al. |
| 8,868,619 B2 | 10/2014 | Raichelgauz et al. |
| 8,880,539 B2 | 11/2014 | Raichelgauz et al. |
| 8,880,566 B2 | 11/2014 | Raichelgauz et al. |
| 8,886,648 B1 | 11/2014 | Procopio et al. |
| 8,898,568 B2 | 11/2014 | Bull et al. |
| 8,922,414 B2 | 12/2014 | Raichelgauz et al. |

(56) References Cited

U.S. PATENT DOCUMENTS

| | | |
|---|---|---|
| 8,959,037 B2 | 2/2015 | Raichelgauz et al. |
| 8,990,125 B2 | 3/2015 | Raichelgauz et al. |
| 9,009,086 B2 | 4/2015 | Raichelgauz et al. |
| 9,031,999 B2 | 5/2015 | Raichelgauz et al. |
| 9,087,049 B2 | 7/2015 | Raichelgauz et al. |
| 9,104,747 B2 | 8/2015 | Raichelgauz et al. |
| 9,165,406 B1 | 10/2015 | Gray et al. |
| 9,191,626 B2 | 11/2015 | Raichelgauz et al. |
| 9,197,244 B2 | 11/2015 | Raichelgauz et al. |
| 9,218,606 B2 | 12/2015 | Raichelgauz et al. |
| 9,235,557 B2 | 1/2016 | Raichelgauz et al. |
| 9,256,668 B2 | 2/2016 | Raichelgauz et al. |
| 9,323,754 B2 | 4/2016 | Ramanathan et al. |
| 9,330,189 B2 | 5/2016 | Raichelgauz et al. |
| 9,384,196 B2 | 7/2016 | Raichelgauz et al. |
| 9,438,270 B2 | 9/2016 | Raichelgauz et al. |
| 2001/0019633 A1 | 9/2001 | Tenze et al. |
| 2001/0038876 A1 | 11/2001 | Anderson |
| 2001/0056427 A1 | 12/2001 | Yoon et al. |
| 2002/0010682 A1 | 1/2002 | Johnson |
| 2002/0019881 A1 | 2/2002 | Bokhari et al. |
| 2002/0038299 A1 | 3/2002 | Zernik et al. |
| 2002/0059580 A1 | 5/2002 | Kalker et al. |
| 2002/0072935 A1 | 6/2002 | Rowse et al. |
| 2002/0087530 A1 | 7/2002 | Smith et al. |
| 2002/0099870 A1 | 7/2002 | Miller et al. |
| 2002/0107827 A1 | 8/2002 | Benitez-Jimenez et al. |
| 2002/0126872 A1 | 9/2002 | Brunk et al. |
| 2002/0129140 A1 | 9/2002 | Peled et al. |
| 2002/0129296 A1 | 9/2002 | Kwiat et al. |
| 2002/0143976 A1 | 10/2002 | Barker et al. |
| 2002/0147637 A1 | 10/2002 | Kraft et al. |
| 2002/0152267 A1 | 10/2002 | Lennon |
| 2002/0157116 A1 | 10/2002 | Jasinschi |
| 2002/0159640 A1 | 10/2002 | Vaithilingam et al. |
| 2002/0161739 A1 | 10/2002 | Oh |
| 2002/0163532 A1 | 11/2002 | Thomas et al. |
| 2002/0174095 A1 | 11/2002 | Lulich et al. |
| 2002/0178410 A1 | 11/2002 | Haitsma et al. |
| 2003/0028660 A1 | 2/2003 | Igawa et al. |
| 2003/0041047 A1 | 2/2003 | Chang et al. |
| 2003/0050815 A1 | 3/2003 | Seigel et al. |
| 2003/0078766 A1 | 4/2003 | Appelt et al. |
| 2003/0086627 A1 | 5/2003 | Berriss et al. |
| 2003/0089216 A1 | 5/2003 | Birmingham et al. |
| 2003/0105739 A1 | 6/2003 | Essafi et al. |
| 2003/0126147 A1 | 7/2003 | Essafi et al. |
| 2003/0182567 A1 | 9/2003 | Barton et al. |
| 2003/0191764 A1 | 10/2003 | Richards |
| 2003/0200217 A1 | 10/2003 | Ackerman |
| 2003/0217335 A1 | 11/2003 | Chung et al. |
| 2003/0229531 A1 | 12/2003 | Heckerman et al. |
| 2004/0003394 A1 | 1/2004 | Ramaswamy |
| 2004/0025180 A1 | 2/2004 | Begeja et al. |
| 2004/0068510 A1 | 4/2004 | Hayes et al. |
| 2004/0107181 A1 | 6/2004 | Rodden |
| 2004/0111465 A1 | 6/2004 | Chuang et al. |
| 2004/0117367 A1 | 6/2004 | Smith et al. |
| 2004/0128142 A1 | 7/2004 | Whitham |
| 2004/0128511 A1 | 7/2004 | Sun et al. |
| 2004/0133927 A1 | 7/2004 | Sternberg et al. |
| 2004/0153426 A1 | 8/2004 | Nugent |
| 2004/0215663 A1 | 10/2004 | Liu et al. |
| 2004/0249779 A1 | 12/2004 | Nauck et al. |
| 2004/0260688 A1 | 12/2004 | Gross |
| 2004/0267774 A1 | 12/2004 | Lin et al. |
| 2005/0021394 A1 | 1/2005 | Miedema et al. |
| 2005/0114198 A1 | 5/2005 | Koningstein et al. |
| 2005/0131884 A1 | 6/2005 | Gross et al. |
| 2005/0144455 A1 | 6/2005 | Haitsma |
| 2005/0172130 A1 | 8/2005 | Roberts |
| 2005/0177372 A1 | 8/2005 | Wang et al. |
| 2005/0238238 A1 | 10/2005 | Xu et al. |
| 2005/0245241 A1 | 11/2005 | Durand et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0013451 A1 | 1/2006 | Haitsma |
| 2006/0020860 A1 | 1/2006 | Tardif et al. |
| 2006/0020958 A1 | 1/2006 | Allamanche et al. |
| 2006/0026203 A1 | 2/2006 | Tan et al. |
| 2006/0031216 A1 | 2/2006 | Semple et al. |
| 2006/0041596 A1 | 2/2006 | Stirbu et al. |
| 2006/0048191 A1 | 3/2006 | Xiong |
| 2006/0064037 A1 | 3/2006 | Shalon et al. |
| 2006/0112035 A1 | 5/2006 | Cecchi et al. |
| 2006/0129822 A1 | 6/2006 | Snijder et al. |
| 2006/0143674 A1 | 6/2006 | Jones et al. |
| 2006/0153296 A1 | 7/2006 | Deng |
| 2006/0159442 A1 | 7/2006 | Kim et al. |
| 2006/0173688 A1 | 8/2006 | Whitham |
| 2006/0184638 A1 | 8/2006 | Chua et al. |
| 2006/0204035 A1 | 9/2006 | Guo et al. |
| 2006/0217818 A1 | 9/2006 | Fujiwara |
| 2006/0217828 A1 | 9/2006 | Hicken |
| 2006/0224529 A1 | 10/2006 | Kermani |
| 2006/0236343 A1 | 10/2006 | Chang |
| 2006/0242139 A1 | 10/2006 | Butterfield et al. |
| 2006/0247983 A1 | 11/2006 | Dalli |
| 2006/0253423 A1 | 11/2006 | McLane et al. |
| 2007/0009159 A1 | 1/2007 | Fan |
| 2007/0011151 A1 | 1/2007 | Hagar et al. |
| 2007/0019864 A1 | 1/2007 | Koyama et al. |
| 2007/0033163 A1 | 2/2007 | Epstein et al. |
| 2007/0038608 A1 | 2/2007 | Chen |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0067682 A1 | 3/2007 | Fang |
| 2007/0071330 A1 | 3/2007 | Oostveen et al. |
| 2007/0074147 A1 | 3/2007 | Wold |
| 2007/0083611 A1 | 4/2007 | Farago et al. |
| 2007/0091106 A1 | 4/2007 | Moroney |
| 2007/0130112 A1 | 6/2007 | Lin |
| 2007/0130159 A1 | 6/2007 | Gulli et al. |
| 2007/0168413 A1 | 7/2007 | Barletta et al. |
| 2007/0174320 A1 | 7/2007 | Chou |
| 2007/0220573 A1 | 9/2007 | Chiussi et al. |
| 2007/0244902 A1 | 10/2007 | Seide et al. |
| 2007/0253594 A1 | 11/2007 | Lu et al. |
| 2007/0255785 A1 | 11/2007 | Hayashi et al. |
| 2007/0268309 A1 | 11/2007 | Tanigawa et al. |
| 2007/0282826 A1 | 12/2007 | Hoeber et al. |
| 2007/0294295 A1 | 12/2007 | Finkelstein et al. |
| 2007/0298152 A1 | 12/2007 | Baets |
| 2008/0046406 A1 | 2/2008 | Seide et al. |
| 2008/0072256 A1 | 3/2008 | Boicey et al. |
| 2008/0091527 A1 | 4/2008 | Silverbrook et al. |
| 2008/0115167 A1* | 5/2008 | Hermsmeyer ...... H04L 67/1095 725/46 |
| 2008/0152231 A1 | 6/2008 | Gokturk et al. |
| 2008/0163288 A1 | 7/2008 | Ghosal et al. |
| 2008/0165861 A1 | 7/2008 | Wen et al. |
| 2008/0172615 A1 | 7/2008 | Igelman et al. |
| 2008/0201299 A1 | 8/2008 | Lehikoinen et al. |
| 2008/0204706 A1 | 8/2008 | Magne et al. |
| 2008/0228995 A1 | 9/2008 | Tan et al. |
| 2008/0237359 A1 | 10/2008 | Silverbrook et al. |
| 2008/0253737 A1 | 10/2008 | Kimura et al. |
| 2008/0263579 A1 | 10/2008 | Mears et al. |
| 2008/0270373 A1 | 10/2008 | Oostveen et al. |
| 2008/0313140 A1 | 12/2008 | Pereira et al. |
| 2009/0013414 A1 | 1/2009 | Washington et al. |
| 2009/0022472 A1 | 1/2009 | Bronstein et al. |
| 2009/0024641 A1 | 1/2009 | Quigley et al. |
| 2009/0037408 A1 | 2/2009 | Rodgers |
| 2009/0043637 A1 | 2/2009 | Eder |
| 2009/0043818 A1 | 2/2009 | Raichelgauz et al. |
| 2009/0089587 A1 | 4/2009 | Brunk et al. |
| 2009/0119157 A1 | 5/2009 | Dulepet |
| 2009/0125544 A1 | 5/2009 | Brindley |

(56) References Cited

U.S. PATENT DOCUMENTS

| | | |
|---|---|---|
| 2009/0148045 A1 | 6/2009 | Lee et al. |
| 2009/0157575 A1 | 6/2009 | Schobben et al. |
| 2009/0172030 A1 | 7/2009 | Schiff et al. |
| 2009/0175538 A1 | 7/2009 | Bronstein et al. |
| 2009/0245573 A1 | 10/2009 | Saptharishi et al. |
| 2009/0245603 A1 | 10/2009 | Koruga et al. |
| 2009/0253583 A1 | 10/2009 | Yoganathan |
| 2009/0277322 A1 | 11/2009 | Cai et al. |
| 2010/0042646 A1 | 2/2010 | Raichelgauz et al. |
| 2010/0082684 A1 | 4/2010 | Churchill et al. |
| 2010/0104184 A1 | 4/2010 | Bronstein et al. |
| 2010/0125569 A1 | 5/2010 | Nair et al. |
| 2010/0162405 A1 | 6/2010 | Cook et al. |
| 2010/0173269 A1 | 7/2010 | Puri et al. |
| 2010/0268524 A1 | 10/2010 | Nath et al. |
| 2010/0306193 A1 | 12/2010 | Pereira et al. |
| 2010/0318493 A1 | 12/2010 | Wessling |
| 2010/0322522 A1 | 12/2010 | Wang et al. |
| 2011/0052063 A1 | 3/2011 | McAuley et al. |
| 2011/0055585 A1 | 3/2011 | Lee |
| 2011/0145068 A1 | 6/2011 | King et al. |
| 2011/0202848 A1 | 8/2011 | Ismalon |
| 2011/0246566 A1 | 10/2011 | Kashef et al. |
| 2011/0251896 A1 | 10/2011 | Impollonia et al. |
| 2011/0296315 A1 | 12/2011 | Lin et al. |
| 2011/0313856 A1 | 12/2011 | Cohen et al. |
| 2012/0082362 A1 | 4/2012 | Diem et al. |
| 2012/0131454 A1 | 5/2012 | Shah |
| 2012/0150890 A1 | 6/2012 | Jeong et al. |
| 2012/0167133 A1 | 6/2012 | Carroll et al. |
| 2012/0185445 A1 | 7/2012 | Borden et al. |
| 2012/0197857 A1 | 8/2012 | Huang et al. |
| 2012/0239694 A1 | 9/2012 | Avner et al. |
| 2012/0299961 A1 | 11/2012 | Ramkumar et al. |
| 2012/0330869 A1 | 12/2012 | Durham |
| 2012/0331011 A1 | 12/2012 | Raichelgauz et al. |
| 2013/0031489 A1 | 1/2013 | Gubin et al. |
| 2013/0066856 A1 | 3/2013 | Ong et al. |
| 2013/0067035 A1 | 3/2013 | Amanat et al. |
| 2013/0067364 A1 | 3/2013 | Berntson et al. |
| 2013/0080433 A1 | 3/2013 | Raichelgauz et al. |
| 2013/0086499 A1 | 4/2013 | Dyor et al. |
| 2013/0089248 A1 | 4/2013 | Remiszewski et al. |
| 2013/0104251 A1 | 4/2013 | Moore et al. |
| 2013/0159298 A1 | 6/2013 | Mason et al. |
| 2013/0173635 A1 | 7/2013 | Sanjeev |
| 2013/0226930 A1 | 8/2013 | Arngren et al. |
| 2013/0325550 A1 | 12/2013 | Varghese et al. |
| 2013/0332951 A1 | 12/2013 | Gharaat et al. |
| 2014/0019264 A1 | 1/2014 | Wachman et al. |
| 2014/0025692 A1 | 1/2014 | Pappas |
| 2014/0147829 A1 | 5/2014 | Jerauld |
| 2014/0152698 A1 | 6/2014 | Kim et al. |
| 2014/0176604 A1 | 6/2014 | Venkitaraman et al. |
| 2014/0188786 A1 | 7/2014 | Raichelgauz et al. |
| 2014/0193077 A1 | 7/2014 | Shiiyama et al. |
| 2014/0250032 A1 | 9/2014 | Huang et al. |
| 2014/0282655 A1 | 9/2014 | Roberts |
| 2014/0300722 A1 | 10/2014 | Garcia |
| 2014/0310825 A1 | 10/2014 | Raichelgauz et al. |
| 2014/0330830 A1 | 11/2014 | Raichelgauz et al. |
| 2015/0154189 A1 | 6/2015 | Raichelgauz et al. |
| 2015/0286742 A1 | 10/2015 | Zhang et al. |
| 2015/0289022 A1 | 10/2015 | Gross |
| 2016/0026707 A1 | 1/2016 | Ong et al. |
| 2016/0239566 A1 | 8/2016 | Raichelgauz et al. |

FOREIGN PATENT DOCUMENTS

| | | |
|---|---|---|
| WO | 2003067467 A1 | 8/2003 |
| WO | 2004019527 A1 | 3/2004 |
| WO | 2005027457 A1 | 3/2005 |
| WO | 20070049282 | 5/2007 |
| WO | 2014137337 A1 | 9/2014 |
| WO | 2016040376 A1 | 3/2016 |

OTHER PUBLICATIONS

The International Search Report and the Written Opinion for PCT/US2016/050471, ISA/RU, Moscow, Ru, dated May 4, 2017.

The International Search Report and the Written Opinion for PCT/US2017/015831, ISA/RU, Moscow, Russia, dated Apr. 20, 2017.

Zou, et al., "A Content-Based Image Authentication System with Lossless Data Hiding", ICME 2003, pp. 213-216.

Vailaya, et al., "Content-Based Hierarchical Classification of Vacation Images," I.E.E.E.: Multimedia Computing and Systems, vol. 1, 1999, East Lansing, MI, pp. 518-523.

Vallet, et al., "Personalized Content Retrieval in Context Using Ontological Knowledge," IEEE Transactions on Circuits and Systems for Video Technology, vol. 17, No. 3, Mar. 2007, pp. 336-346.

Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005.

Verstraeten et al.: "Isolated word recognition with the Liquid State Machine: a case study", Information Processing Letters, Amsterdam, NL, vol. 95, No. 6, Sep. 30, 2005 (Sep. 30, 2005), pp. 521-528, XP005028093 ISSN: 0020-0190.

Wang et al. "A Signature for Content-based Image Retrieval Using a Geometrical Transform", ACM 1998, pp. 229-234.

Ware et al., "Locating and Identifying Components in a Robot's Workspace using a Hybrid Computer Architecture"; Proceedings of the 1995 IEEE International Symposium on Intelligent Control, Aug. 27-29, 1995, pp. 139-144.

Wei-Te Li et al., "Exploring Visual and Motion Saliency for Automatic Video Object Extraction", IEEE, vol. 22, No. 7, Jul. 2013, pp. 1-11.

Whitby-Strevens, "The Transputer", 1985 IEEE, Bristol, UK.

Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.

Yanai, "Generic Image Classification Using Visual Knowledge on the Web," MM'03, Nov. 2-8, 2003, Tokyo, Japan, pp. 167-176.

Zang, et al., "A New Multimedia Message Customizing Framework for Mobile Devices", Multimedia and Expo, 2007 IEEE International Conference on Year: 2007, pp. 1043-1046, DOI: 10.1109/ICME.2007.4284832 IEEE Conference Publications.

Zeevi, Y. et al.: "Natural Signal Classification by Neural Cliques and Phase-Locked Attractors", IEEE World Congress on Computational Intelligence, IJCNN2006, Vancouver, Canada, Jul. 2006 ( Jul. 2006), XP002466252.

Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002.

Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.

Zhu et al., Technology-Assisted Dietary Assessment. Computational Imaging VI, edited by Charles A. Bouman, Eric L. Miller, Ilya Pollak, Proc. of SPIE-IS&T Electronic Imaging, SPIE vol. 6814, 681411, Copyright 2008 SPIE-IS&T. pp. 1-10.

Boari et al, "Adaptive Routing for Dynamic Applications in Massively Parallel Architectures", 1995 IEEE, Spring 1995.

Brecheisen, et al., "Hierarchical Genre Classification for Large Music Collections", ICME 2006, pp. 1385-1388.

Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

Cernansky et al., "Feed-forward Echo State Networks"; Proceedings of International Joint Conference on Neural Networks, Montreal, Canada, Jul. 31-Aug. 4, 2005.

Chuan-Yu Cho, et al., "Efficient Motion-Vector-Based Video Search Using Query by Clip", 2004, IEEE, Taiwan, pp. 1-4.

(56) References Cited

OTHER PUBLICATIONS

Clement, et al. "Speaker Diarization of Heterogeneous Web Video Files: A Preliminary Study", Acoustics, Speech and Signal Processing (ICASSP), 2011, IEEE International Conference on Year: 2011, pp. 4432-4435, DOI: 10.1109/ICASSP.2011.5947337 IEEE Conference Publications, France.

Cococcioni, et al, "Automatic Diagnosis of Defects of Rolling Element Bearings Based on Computational Intelligence Techniques", University of Pisa, Pisa, Italy, 2009.

Emami, et al, "Role of Spatiotemporal Oriented Energy Features for Robust Visual Tracking in Video Surveillance, University of Queensland", St. Lucia, Australia, 2012.

Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.

Foote, Jonathan et al., "Content-Based Retrieval of Music and Audio"; 1997, Institute of Systems Science, National University of Singapore, Singapore (Abstract).

Freisleben et al., "Recognition of Fractal Images Using a Neural Network", Lecture Notes in Computer Science, 1993, vol. 6861, 1993, pp. 631-637.

Garcia, "Solving the Weighted Region Least Cost Path Problem Using Transputers", Naval Postgraduate School, Monterey, California, Dec. 1989.

Gomes et al., "Audio Watermaking and Fingerprinting: For Which Applications?" University of Rene Descartes, Paris, France, 2003.

Gong, et al., "A Knowledge-based Mediator for Dynamic Integration of Heterogeneous Multimedia Information Sources", Video and Speech Processing, 2004, Proceedings of 2004 International Symposium on Year: 2004, pp. 467-470, DOI: 10.1109/ISIMP.2004. 1434102 IEEE Conference Publications, Hong Kong.

Guo et al, "AdOn: An Intelligent Overlay Video Advertising System", SIGIR, Boston, Massachusetts, Jul. 19-23, 2009.

Howlett et al., "A Multi-Computer Neural Network Architecture in a Virtual Sensor System Application", International Journal of Knowledge-based Intelligent Engineering Systems, 4 (2). pp. 86-93, 133N 1327-2314; first submitted Nov. 30, 1999; revised version submitted Mar. 10, 2000.

Ihab Al Kabary, et al., "SportSense: Using Motion Queries to Find Scenes in Sports Videos", Oct. 2013, ACM, Switzerland, pp. 1-3.

International Search Authority: "Written Opinion of the International Searching Authority" (PCT Rule 43bis.1) including International Search Report for International Patent Application No. PCT/US2008/073852; dated Jan. 28, 2009.

International Search Authority: International Preliminary Report on Patentability (Chapter I of the Patent Cooperation Treaty) including "Written Opinion of the International Searching Authority" (PCT Rule 43bis. 1) for the corresponding International Patent Application No. PCT/IL2006/001235; dated Jul. 28, 2009.

International Search Report for the corresponding International Patent Application PCT/IL2006/001235; dated Nov. 2, 2008.

IPO Examination Report under Section 18(3) for corresponding UK application No. GB1001219.3, dated Sep. 12, 2011.

Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.

Jaeger, H.: "The "echo state" approach to analysing and training recurrent neural networks", GMD Report, No. 148, 2001, pp. 1-43, XP002466251 German National Research Center for Information Technology.

Jianping Fan et al., "Concept-Oriented Indexing of Video Databases: Towards Semantic Sensitive Retrieval and Browsing", IEEE, vol. 13, No. 7, Jul. 2004, pp. 1-19.

Li, et al., "Matching Commercial Clips from TV Streams Using a Unique, Robust and Compact Signature," Proceedings of the Digital Imaging Computing: Techniques and Applications, Feb. 2005, vol. 0-7695-2467, Australia.

Lin, C.; Chang, S.: "Generating Robust Digital Signature for Image/Video Authentication", Multimedia and Security Workshop at ACM Multimedia '98; Bristol, U.K., Sep. 1998; pp. 49-54.

Lin, et al., "Robust Digital Signature for Multimedia Authentication: A Summary", IEEE Circuits and Systems Magazine, 4th Quarter 2003, pp. 23-26.

Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP.2009.4960375, IEEE Conference Publications, Arizona.

Liu, et al., "Instant Mobile Video Search With Layered Audio-Video Indexing and Progressive Transmission", Multimedia, IEEE Transactions on Year: 2014, vol. 16, Issue: 8, pp. 2242-2255, DOI: 10.1109/TMM.2014.2359332 IEEE Journals & Magazines.

Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.

Maass, W. et al.: "Computational Models for Generic Cortical Microcircuits", Institute for Theoretical Computer Science, Technische Universitaet Graz, Graz, Austria, published Jun. 10, 2003.

Mandhaoui, et al, "Emotional Speech Characterization Based on Multi-Features Fusion for Face-to-Face Interaction", Universite Pierre et Marie Curie, Paris, France, 2009.

Marti, et al,"Real Time Speaker Localization and Detection System for Camera Steering in Multiparticipant Videoconferencing Environments", Universidad Politecnica de Valencia, Spain, 2011.

May et al., "The Transputer", Springer-Verlag, Berlin Heidelberg, 1989, teaches multiprocessing system.

Mei, et al., "Contextual In-Image Advertising", Microsoft Research Asia, pp. 439-448, 2008.

Mei, et al., "VideoSense—Towards Effective Online Video Advertising", Microsoft Research Asia, pp. 1075-1084, 2007.

Mladenovic, et al., "Electronic Tour Guide for Android Mobile Platform with Multimedia Travel Book", Telecommunications Forum (TELFOR), 2012 20th Year: 2012, pp. 1460-1463, DOI: 10.1109/TELFOR.2012.6419494 IEEE Conference Publications.

Morad, T.Y. et al.: "Performance, Power Efficiency and Scalability of Asymmetric Cluster Chip Multiprocessors", Computer Architecture Letters, vol. 4, Jul. 4, 2005 (Jul. 4, 2005), pp. 1-4, XP002466254.

Nagy et al, "A Transputer, Based, Flexible, Real-Time Control System for Robotic Manipulators", UKACC International Conference on CONTROL '96, Sep. 2-5, 1996, Conference 1996, Conference Publication No. 427, IEE 1996.

Nam, et al., "Audio Visual Content-Based Violent Scene Characterization", Department of Electrical and Computer Engineering, Minneapolis, MN, 1998, pp. 353-357.

Natsclager, T. et al.: "The "liquid computer": A novel strategy for real-time computing on time series", Special Issue on Foundations of Information Processing of Telematik, vol. 8, No. 1, 2002, pp. 39-43, XP002466253.

Nouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.1109/MMSP.2012.6343465, Czech Republic.

Ortiz-Boyer et al., "CIXL2: A Crossover Operator for Evolutionary Algorithms Based on Population Features", Journal of Artificial Intelligence Research 24 (2005), pp. 1-48 Submitted Nov. 2004; published Jul. 2005.

Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE Conference Publications.

Raichelgauz, I. et al.: "Co-evolutionary Learning in Liquid Architectures", Lecture Notes in Computer Science, [Online] vol. 3512, Jun. 21, 2005 (Jun. 21, 2005), pp. 241-248, XP019010280 Springer Berlin / Heidelberg ISSN: 1611-3349 ISBN: 978-3-540-26208-4.

Ribert et al. "An Incremental Hierarchical Clustering", Visicon Interface 1999, pp. 586-591.

(56) References Cited

OTHER PUBLICATIONS

Scheper et al, "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.

Semizarov et al. "Specificity of Short Interfering RNA Determined through Gene Expression Signatures", PNAS, 2003, pp. 6347-6352.

Shih-Fu Chang, et al., "VideoQ: A Fully Automated Video Retrieval System Using Motion Sketches", 1998, IEEE, , New York, pp. 1-2.

Theodoropoulos et al, "Simulating Asynchronous Architectures on Transputer Networks", Proceedings of the Fourth Euromicro Workshop on Parallel and Distributed Processing, 1996. PDP '96.

Lau, et al., "Semantic Web Service Adaptation Model for a Pervasive Learning Scenario", 2008 IEEE Conference on Innovative Technologies in Intelligent Systems and Industrial Applications Year: 2008, pp. 98-103, DOI: 10.1109/ITISIA.2008.4607342 IEEE Conference Publications.

McNamara, et al., "Diversity Decay in Opportunistic Content Sharing Systems", 2011 IEEE International Symposium on a World of Wireless, Mobile and Multimedia Networks Year: 2011, pp. 1-3, DOI: 10.1109/WoWMoM.2011.5986211 IEEE Conference Publications.

Santos, et al., "SCORM-MPEG: An Ontology of Interoperable Metadata for Multimedia and e-Learning", 2015 23rd International Conference on Software, Telecommunications and Computer Networks (SoftCOM) Year. 2015, pp. 224-228, DOI: 10.1109/SOFTCOM.2015.7314122 IEEE Conference Publications.

Wilk, et al., "The Potential of Social-Aware Multimedia Prefetching on Mobile Devices", 2015 International Conference and Workshops on Networked Systems (NetSys) Year: 2015, pp. 1-5, DOI: 10.1109/NetSys.2015.7089081 IEEE Conference Publications.

Odinaev, et al., "Cliques in Neural Ensembles as Perception Carriers", Technion—Israel Institute of Technology, 2006 International Joint Conference on Neural Networks, Canada, 2006, pp. 285-292.

The International Search Report and the Written Opinion for PCT/US2016/054634 dated Mar. 16, 2017, ISA/RU, Moscow, RU.

Hua, et al., "Robust Video Signature Based on Ordinal Measure", Image Processing, 2004. 2004 International Conference on Image Processing (ICIP), vol. 1, IEEE, pp. 685-688, 2004.

Queluz, "Content-Based Integrity Protection of Digital Images", SPIE Conf. on Security and Watermarking of Multimedia Contents, San Jose, Jan. 1999, pp. 85-93, downloaded from http://proceedings.spiedigitallibrary.org/ on Aug. 2, 2017.

Schneider, et. al., "A Robust Content Based Digital Signature for Image Authentication", Proc. ICIP 1996, Laussane, Switzerland, Oct. 1996, pp. 227-230.

Yanagawa, et al., "Columbia University's Baseline Detectors for 374 LSCOM Semantic Visual Concepts." Columbia University ADVENT technical report, 2007, pp. 222-2006-8.

\* cited by examiner

SYSTEMS AND METHODS FOR GENERATION OF SEARCHABLE STRUCTURES RESPECTIVE OF MULTIMEDIA DATA CONTENT

CROSS-REFERENCE TO RELATED APPLICATIONS

This application is a continuation of U.S. patent application Ser. No. 14/509,558 filed on Oct. 8, 2014, now allowed, which is a continuation of U.S. patent application Ser. No. 13/602,858 filed on Sep. 4, 2012, now U.S. Pat. No. 8,868,619. The Ser. No. 13/602,858 application is a continuation of U.S. patent application Ser. No. 12/603,123 filed on Oct. 21, 2009, now U.S. Pat. No. 8,266,185. The Ser. No. 12/603,123 application is a continuation-in-part of:

(1) U.S. patent application Ser. No. 12/084,150 having a filing date of Apr. 7, 2009, now U.S. Pat. No. 8,655,801, which is the National Stage of International Application No. PCT/IL2006/001235 filed on Oct. 26, 2006, which claims foreign priority from Israeli Application No. 171577 filed on Oct. 26, 2005 and Israeli Application No. 173409 filed on Jan. 29, 2006;

(2) U.S. patent application Ser. No. 12/195,863 filed on Aug. 21, 2008, now U.S. Pat. No. 8,326,775, which claims priority under 35 USC 119 from Israeli Application No. 185414 filed on Aug. 21, 2007, and which is also a continuation-in-part of the above-referenced U.S. patent application Ser. No. 12/084,150;

(3) U.S. patent application Ser. No. 12/348,888, filed Jan. 5, 2009, now pending, which is a CIP of the above-referenced U.S. patent application Ser. No. 12/084,150 and the above-referenced U.S. patent application Ser. No. 12/195,863; and (4) U.S. patent application Ser. No. 12/538,495 filed on Aug. 10, 2009, now U.S. Pat. No. 8,312,031, which is a continuation-in-part of the above-referenced U.S. patent application Ser. No. 12/084,150; the above-referenced U.S. patent application Ser. No. 12/195,863; and the above-referenced U.S. patent application Ser. No. 12/348,888.

All of the applications referenced above are herein incorporated by reference.

TECHNICAL FIELD

The disclosure relates generally to content-management and search engines, and more particularly to the collection, clustering, and creation of concept structures of multimedia data elements for the purpose of effective storage, management, knowledge database generation, and searching.

BACKGROUND

With the abundance of multimedia data made available through various means in general and the Internet and world-wide web (WWW) in particular, there is a need for effective ways of searching for multimedia data, and management of such multimedia data. Searching, organizing, and management of multimedia data in general and video data in particular may be challenging at best due to the difficulty of representing and comparing the information embedded in the video content, and due to the scale of information that needs to be checked. Moreover, when it is necessary to find a content of a video by means of textual query, prior art cases revert to various metadata that textually describe the content of the multimedia data. However, such content may be abstract and complex by nature and not necessarily adequately defined by the existing and/or attached metadata.

The rapid increase in multimedia databases, accessible for example through the Internet, calls for the application of new methods of representation of information embedded in video content. Searching for multimedia in general and for video data in particular is challenging due to the huge amount of information that has to be first indexed, classified and clustered. Moreover, prior art techniques revert to model-based methods to define and/or describe multimedia data. However, by its very nature, the structure of such multimedia data may be too abstract and/or complex to be adequately represented by means of metadata. The difficulty arises in cases where the target sought for multimedia data is not adequately defined in words, or by respective metadata of the multimedia data. For example, it may be desirable to locate a car of a particular model in a large database of video clips or segments. In some cases the model of the car would be part of the metadata but in many cases it would not. Moreover, the car may be oriented at angles different from the angles of a specific photograph of the car that is available as a search item. Similarly, if a piece of music, as in a sequence of notes, is to be found, it is not necessarily the case that in all available content the notes are known in their metadata form, or for that matter, the search pattern may just be a brief audio clip.

A system implementing a computational architecture (hereinafter "the Architecture") that is based on a PCT patent application publication number WO2007/049282 and published on May 3, 2007, entitled "A Computing Device, a System and a Method for Parallel Processing of Data Streams", assigned to common assignee, is hereby incorporated by reference for all the useful information it contains. Generally, the Architecture consists of a large ensemble of randomly, independently generated, heterogeneous processing cores, mapping in parallel data-segments onto a high-dimensional space and generating compact signatures for classes of interest.

Searching multimedia data has been a challenge of past years and has therefore received considerable attention. Early systems would take a multimedia data element in the form of, for example an image, compute various visual features from it and then search one or more indexes to return images with similar features. In addition, values for these features and appropriate weights reflecting their relative importance could be also used. Searching and indexing techniques have improved over time to handle various types of multimedia inputs and to handle such inputs with ever increasing effectiveness. However, since the exponential growth of the use of the Internet and the multimedia data available therein, these prior art systems have become less effective in handling the multimedia data due to the vast amounts of data already existing, as well as the speed at which new ones are added.

Searching has therefore become a significant challenge and even the addition of metadata to assist in the search has limited functionality. Firstly, metadata may be inaccurate or not fully descriptive of the multimedia data, and secondly, not every piece of multimedia data can be accurately enough described by a sequence of textual metadata. A query model for a search engine has some advantages, such as comparison and ranking of images based on objective visual features, rather than on subjective image annotations. However, the query model has its drawbacks as well. Certainly when no metadata is available and only the multimedia data needs to be used, the process requires significant effort. Those skilled in the art will appreciate that there is no known intuitive way of describing multimedia data. Therefore, a large gap may be found between a user's perception or conceptual understanding of the multimedia data and the way it is actually stored and manipulated by a search engine.

The current generation of web applications has become more and more effective at aggregating massive amounts of data of various multimedia content such as pictures, videos, clips, paintings, and mash-ups, and is capable of slicing and dicing it in different ways, as well as searching it and displaying it in an organized fashion, by using, for example, concept networks. A concept may enable understanding of multimedia data from its related concept. However, current art is unable to add any real "intelligence" to the mix, i.e., no new knowledge is extracted from the multimedia data that are aggregated by existing systems. Moreover, the existing systems tend to be non-scalable due to the vast amounts of data they have to handle. This, by definition, hinders the ability to provide high quality searching for multimedia content.

There is therefore a need in the art to overcome the deficiencies of the prior art solutions by providing the building element for a search engine for content-management of multimedia data that is intelligent, effective, and scalable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for generating concept structures based on a plurality of multimedia data elements (MMDEs). The method includes: generating, based on the plurality of MMDEs, a plurality of patches, wherein each patch is at least a portion of one of the MMDEs; generating, based on the plurality of patches, a plurality of signatures for the plurality of MMDEs; clustering the generated plurality of signatures into a plurality of clusters; generating metadata for each of the plurality of clusters; and creating, based on the plurality of clusters, at least one concept structure, wherein each concept structure includes at least one of the plurality of clusters and the metadata associated with the at least one of the plurality of clusters.

Certain embodiments disclosed herein also include a non-transitory computer readable medium having stored thereon instructions for causing one or more processing units to perform a process, the process comprising: generating, based on the plurality of MMDEs, a plurality of patches, wherein each patch is at least a portion of one of the MMDEs; generating, based on the plurality of patches, a plurality of signatures for the plurality of MMDEs; clustering the generated plurality of signatures into a plurality of clusters; generating metadata for each of the plurality of clusters; and creating, based on the plurality of clusters, at least one concept structure, wherein each concept structure includes at least one of the plurality of clusters and the metadata associated with the at least one of the plurality of clusters.

Certain embodiments disclosed herein also include a system for generating concept structures based on a plurality of multimedia data elements (MMDEs). The system comprises: a processing circuitry; and a memory, the memory containing instructions that, when executed by the processing circuitry, configure the system to: generate, based on the plurality of MMDEs, a plurality of patches, wherein each patch is at least a portion of one of the MMDEs; generate, based on the plurality of patches, a plurality of signatures for the plurality of MMDEs; cluster the generated plurality of signatures into a plurality of clusters; generate metadata for each of the plurality of clusters; and create, based on the plurality of clusters, at least one concept structure, wherein each concept structure includes at least one of the plurality of clusters and the metadata associated with the at least one of the plurality of clusters.

BRIEF DESCRIPTION OF THE DRAWINGS

The subject matter disclosed herein is particularly pointed out and distinctly claimed in the claims at the conclusion of the specification. The foregoing and other objects, features and advantages of the disclosed embodiments will be apparent from the following detailed description taken in conjunction with the accompanying drawings.

DETAILED DESCRIPTION

Figure 1:
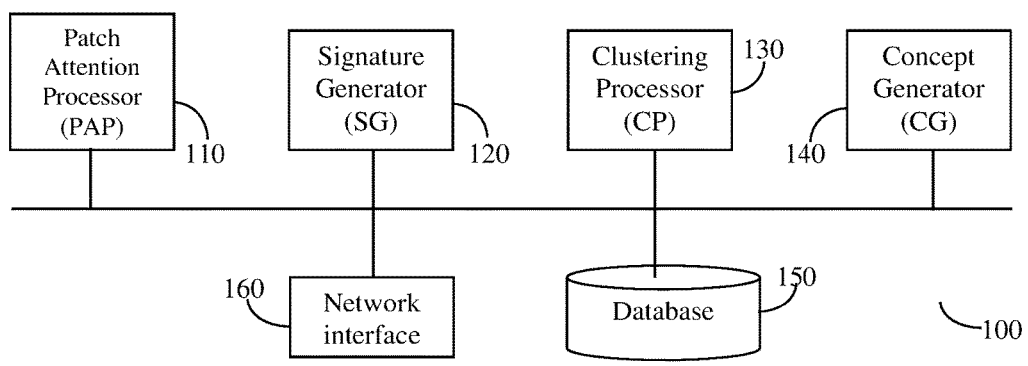
FIG. 1 is a diagram of a DCC system for creating concept structures in accordance with an embodiment.

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Certain example embodiments include a large-scale web-platform for a multimedia deep-content-classification (DCC) system, capable of continuously creating a knowledge database for multimedia data. The DCC system initially receives a large number of multimedia data elements (MMDEs) to create a knowledge base that is condensed into concept structures that are efficient to store, retrieve, and check for matches. As new MMDEs are collected, they are efficiently added to the knowledge base and concept structures such that the resource requirement is generally sub-linear rather than linear or exponential. The DCC system extracts patterns from each MMDE and selects the important/salient patterns for the creation of signatures thereof. A process of inter-matching between the patterns followed by clustering, is followed by reduction of the number of signatures in a cluster to a minimum that maintains matching and enables generalization to new MMDEs. Metadata respective of the MMDEs is collected, thereby forming, together with the reduced clusters, a concept structure.

FIG. 1 shows an example diagram of a DCC system 100 for creating concept structures provided in accordance with an embodiment. The DCC system 100 is capable of receiving multimedia data elements (MMDEs), for example from the Internet via the network interface 160. The MMDEs include, but are not limited to, images, graphics, video streams, video clips, audio streams, audio clips, video frames, photographs, images of signals, combinations thereof, and portions thereof. The images of signals are images such as, but not limited to, medical signals, geophysical signals, subsonic signals, supersonic signals, electromagnetic signals, and infrared signals. In one embodiment, the MMDEs are stored in a database (DB) 150. In another embodiment, references to the MMDEs are kept in the DB 150 for future retrieval of the respective multimedia data elements. Such a reference may be, but is not limited to, a universal resource locator (URL).

Every MMDE in the DB 150, or referenced therefrom, is then processed by a patch attention processor (PAP) 110, thereby resulting in a plurality of patches that are of specific interest, or are otherwise of higher interest than other patches. In one embodiment, a more general pattern extraction, such as an attention processor (AP) is used in lieu of patches. The AP receives the MMDE that is partitioned into items. An item may be an extracted pattern or a patch, or any other applicable partition depending on the type of the MMDE. The functions of the PAP 110 are described herein below in more detail. Those patches that are of higher interest are then used by a signature generator (SG) 120 to generate signatures respective of the patch. The operation of the signature generator is described in more detail herein below. A clustering process (CP) 130 initiates a process of inter-matching of the signatures once it determines that there are a number of patches that is above a predefined threshold. In one embodiment the threshold is defined to be large enough to enable proper and meaningful clustering. With a plurality of clusters, a process of clustering reduction takes place so as to extract the most useful data about the cluster and keep it at an optimal size to produce meaningful results. The process of cluster reduction is continuous. When new signatures are provided after the initial phase of the operation of the CP 130, the new signatures may be immediately checked against the reduced clusters to save on the operation of the CP 130. A more detailed description of the operation of the CP 130 is provided herein below.

A concept generator (CG) 140 operates to create concept structures from the reduced clusters provided by the CP 130. Each concept structure comprises a plurality of metadata associated with the reduced clusters. The result is a compact representation of a concept that can now be easily compared against a MMDE to determine if the received MMDE matches a concept structure stored, for example, in the DB 150, by the CG 140. This can be done, for example and without limitation, by providing a query to the DCC system 100 for finding a match between a concept structure and a MMDE. A more detailed description of the operation of the CG 140 is provided herein below.

It should be appreciated that the DCC system 100 can generate a number of concept structures that is significantly smaller than the number of MMDEs. For example, if one billion ($10^9$) MMDEs need to be checked for a match against another one billion MMDEs, typically the result is that no less than $10^9 \times 10^9 = 10^{18}$ matches have to take place, a daunting undertaking. The DCC system 100 would typically have around 10 million concept structures or less, and therefore at most only $2 \times 10^6 \times 10^9 = 2 \times 10^{15}$ comparisons need to take place, a mere 0.2% of the number of matches that had to be made by other solutions. As the number of concept structures grows significantly slower than the number of MMDEs, the advantages of the DCC system 100 would be apparent to one with ordinary skill in the art.

The operation of the PAP 110 will now be provided in greater detail with respect to an image of the MMDE. However, this should not be understood as to limit the scope of the disclosed embodiments; other types of MMDEs are specifically included herein and may be handled by the PAP 110.

Figure 2:
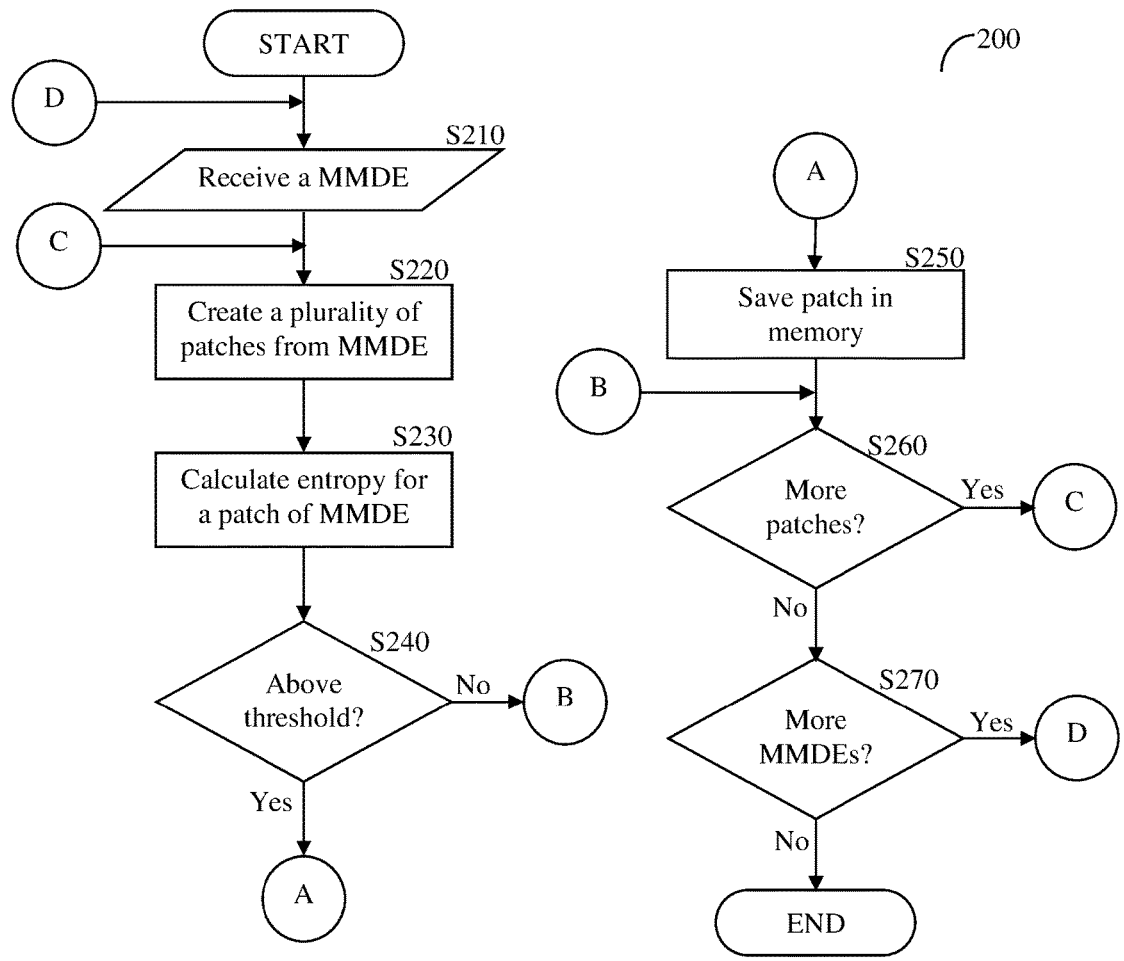
FIG. 2 is a flowchart illustrating the operation of the patch attention processor in accordance with an embodiment.

FIG. 2 depicts an example flowchart 200 of the operation of the PAP 110. In S210, the PAP110 receives a MMDE from a source for such MMDEs. Such source may be a system that feeds the DCC system 100 with MMDEs or other sources for MMDEs such as, for example, the world-wide-web (WWW). In S220, the PAP 110 creates a plurality of patches from the MMDE. A patch of an image is defined by, for example, its size, scale, location, and orientation. A patch may be, for example and without limitation, a portion of a size 20 pixels by 20 pixels of an image that is 1,000 pixels by 500 pixels. In the case of audio, a patch may be a segment of audio 0.5 seconds in length from a 5 minute audio clip. In S230, a patch that has not been previously checked is processed to determine its entropy. The entropy is a measure of the amount of interesting information that may be present in the patch. For example, a continuous color of the patch has little interest, whereas sharp edges, corners, or borders will result in higher entropy, thereby representing a lot of interesting information. In one embodiment, a plurality of statistically independent cores, the operation of which is discussed in more detail herein below, is used to determine the level-of-interest of the image, and a process of voting takes place to determine whether the patch is of interest or not.

In S240, it is checked whether the entropy was determined to be above a predefined threshold and, if so, execution continues with S250; otherwise, execution continues with S260. In S250, the patch having an entropy above the predefined threshold is stored for future use by the SG 120 in, for example, the DB 150. In S260, it is checked whether there are more patches of the MMDE to be checked and, if so, execution continues with S220; otherwise, execution continues with S270. In S270, it is checked whether there are additional MMDEs and, if so, execution continues with S210; otherwise, execution terminates. It would be appreciated by those of skill in the art that this process reduces the information that must be handled by the DCC system 100 by focusing on areas of interest in the MMDEs rather than areas that are less meaningful for the formation of a concept structure.

Figure 3:
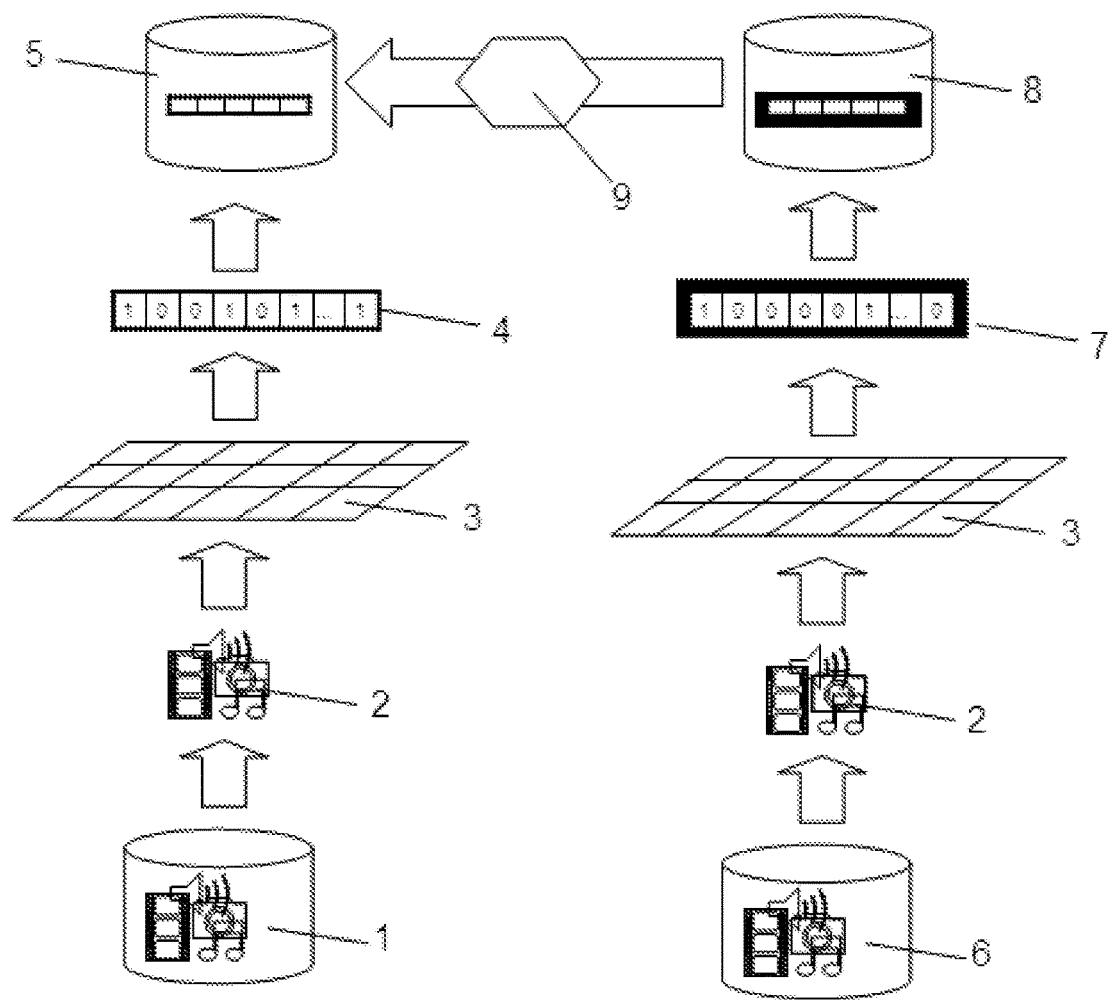
FIG. 3 is a block diagram depicting the basic flow of information in a large-scale video matching system.

A high-level description of the process for large scale video matching performed by the Matching System is depicted in FIG. 3. Video content segments 2 from a Master DB 6 and a Target DB 1 are processed in parallel by a large number of independent computational Cores 3 that constitute the Architecture. Further details on the computational Cores' generation are provided below. The independent Cores 3 generate a database of Robust Signatures and Signatures 4 for Target content-segments 5 and a database of Robust Signatures and Signatures 7 for Master content-segments 8. An example process of signature generation for an audio component is shown in detail in FIG. 4. Referring back to FIG. 3, at the final step, Target Robust Signatures and/or Signatures are effectively matched, by a matching algorithm 9, to Master Robust Signatures and/or a Signatures database to find all matches between the two databases.

A brief description of the operation of the SG 120 is therefore provided, this time with respect to a MMDE which is a sound clip. However, this should not be understood as to limit the scope of the disclosed embodiments and other types of MMDEs are specifically included herein and may be handled by the SG 120. To demonstrate an example of a signature generation process, it is assumed, merely for the sake of simplicity and without limitation on the generality of the disclosed embodiments, that the signatures are based on a single frame, leading to certain simplification of the computational core's generation. The Matching System shown in FIG. 3 is extensible for signatures generation capturing the dynamics in-between the frames and the information of the frame's patches.

Figure 4:
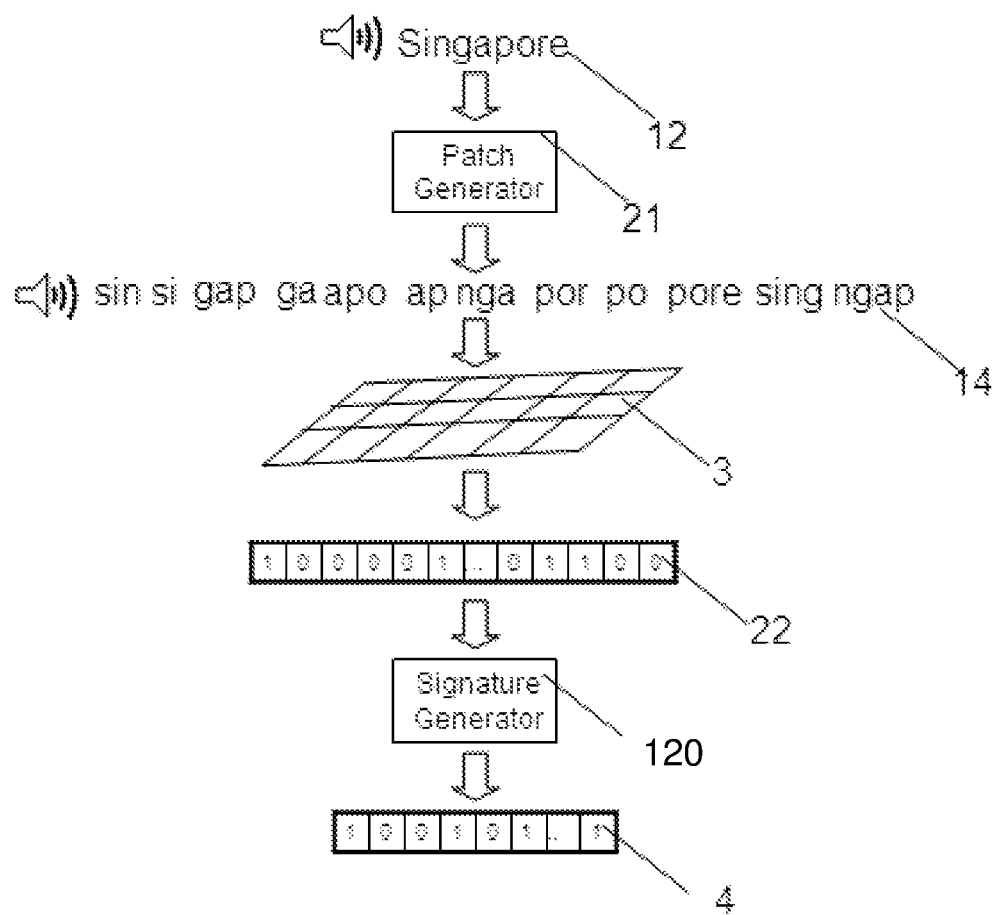
FIG. 4 is a diagram showing the flow of patches generation, response vector generation, and signature generation in a large-scale speech-to-text system.

The signatures generation process will be described with reference to FIG. 4. The first step in the process of signatures generation from a given speech-segment is to break-down the speech-segment to K patches 14 of random length P and random position within the speech segment 12. The breakdown is performed by the patch generator component 21. The value of K is determined based on optimization, considering the tradeoff between accuracy rate and the number of fast matches required in the flow process of the System. In the next step, all the K patches are injected in parallel to all L computational Cores 3 to generate K response vectors 22. The vectors 22 are fed into the SG 120 to produce a Signatures and Robust Signatures 4.

In order to generate Robust Signatures, i.e., Signatures that are robust to additive noise L (where L is an integer equal to or greater than 1) computational cores are utilized in the Matching System. A frame i is injected into all the Cores. The computational cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $C_i=\{n_i\}$ (1≤i≤L) may consist of a single leaky integrate-to-threshold unit (LTU) node or more nodes. The node $n_i$ equations are:

$$V_i = \sum_j w_{ij} k_j$$

$n_i=\theta(V_i-Th_x)$; θ is a Heaviside step function; $w_{ij}$ is a coupling node unit (CNU) between node i and image component j (for example, grayscale value of a certain pixel j); $k_j$ is an image component j (for example, grayscale value of a certain pixel j); $Th_x$ is a constant Threshold value, where x is 'S' for Signature and 'RS' for Robust Signature; and $V_i$ is a Coupling Node Value.

The Threshold values $Th_x$ are set differently for Signature generation and for Robust Signature generation. For example, for a certain distribution of $V_i$ values (for the set of nodes), the thresholds for Signature ($Th_S$) and Robust Signature ($Th_{RS}$) are set apart, after optimization, according to at least one or more of the following criteria:

For: $V_i > Th_{RS}$ $1-p(V>Th_S)-1-(1-\varepsilon)^l \ll 1$     I i.e., given that l nodes (cores) constitute a Robust Signature of a certain image I, the probability that not all of these l nodes will belong to the Signature of same, but noisy image, $\tilde{I}$ is sufficiently low (according to a system's specified accuracy).

$p(V_i>Th_{RS})\approx l/L$     II i.e., approximately l out of the total L nodes can be found to generate Robust Signature according to the above definition.

III: Both Robust Signature and Signature are generated for certain frame i.

It should be understood that the creation of a signature is a unidirectional compression where the characteristics of the compressed data are maintained but the compressed data cannot be reconstructed. Therefore, a signature can be used for the purpose of comparison to another signature without the need of comparison to the original data. Detailed description of the signature generation process can be found in the co-pending patent applications of which this patent application is a continuation-in-part of, and are hereby incorporated by reference.

Computational Core generation is a process of definition, selection and tuning of the Architecture parameters for a certain realization in a specific system and application. The process is based on several design considerations, such as: (a) The Cores should be designed so as to obtain maximal independence, i.e. the projection from a signal space should generate a maximal pair-wise distance between any two cores' projections into a high-dimensional space; (b) The Cores should be optimally designed for the type of signals, i.e. the Cores should be maximally sensitive to the spatiotemporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power, and, (c) The Cores should be optimally designed with regard to invariance to set of signal distortions, of interest in relevant applications.

Hence, in an embodiment, signatures are generated by the SG 120 responsive of patches received either from the PAP 110, or retrieved from the DB 150, in accordance with the principles shown hereinabove. It should be noted that other ways for generating signatures may also be used for the purposes the DCC system 100 without departing from the scope of the disclosed embodiments. Furthermore, as noted above, the array of cores may be used by the PAP 110 for the purpose of determining if a patch has an entropy level that is of interest for signature generation according to the principles of the disclosed embodiments. The generated signatures are stored, for example, in the DB 150, with reference to the MMDE and the patch for which it was generated thereby enabling back annotation as may be necessary.

Portions of the CP 130 have been discussed in detail in the co-pending U.S. patent application Ser. No. 12/507,489, entitled "Unsupervised Clustering of Multimedia Data Using a Large-Scale Matching System", filed Jul. 22, 2009, assigned to common assignee (the "'489 application"), and which is hereby incorporated for all that it contains. In accordance with an embodiment, an inter-match process and clustering thereof is utilized. The process can be performed on signatures provided by the SG 120. It should be noted though that this inter-matching and clustering process is merely an example for the operation of the CP 130 and other inter-matching and/or clustering processes may be used.

Following is a brief description of the inter-match and clustering process. The unsupervised clustering process maps a certain content-universe onto a hierarchical structure of clusters. The content-elements of the content-universe are mapped to signatures, when applicable. The signatures of all the content-elements are matched to each other, and consequently generate the inter-match matrix. The described clustering process leads to a set of clusters. According to an embodiment, each cluster is represented by a small/compressed number of signatures such as, for example, signatures generated by the SG 120 as further explained hereinabove, which can be increased by variants. This results in a highly compressed representation of the content-universe. In one embodiment, a connection graph between the multimedia data elements of a cluster may be stored. The graph can be used to assist a user searching for data to move along the graph in the search of a desired multimedia data element.

In another embodiment, upon determination of a cluster, a signature for the whole cluster may be generated based on the signatures of the multimedia data elements that belong to the cluster. It should be appreciated that using a Bloom filter may be used to reach such signatures. Furthermore, as the signatures in accordance with the principles of the disclosed embodiments are correlated to some extent, the hash functions of the Bloom filter may be replaced by simpler pattern detectors, with the Bloom filter being the upper limit.

While signatures are used here as the basic data elements, it should be realized that other data elements may be clustered using the principles of the disclosure. For example, a system generating data items is used, where the data items generated may be clustered according to the disclosed principles. Such data items may be, without limitation, multimedia data elements. The clustering process may be performed by dedicated hardware or by using a computing device having storage to store the data items generated by the system and then performing the process described herein above. Then, the clusters can be stored in memory for use as may be deemed necessary.

The CP 130 further uses an engine designed to reduce the number of signatures used in a cluster, thereby extracting only the most meaningful signatures that identify the cluster uniquely. This can be done by testing a removal of a signature from a cluster and checking if the MMDEs associated with the cluster still are capable of being recognized by the cluster through signature matching. The process of signature extraction is on-going as the DCC system 100 operates. It should be noted that, after initialization and upon generation of a signature for a MMDE by the SG 120, the MMDE's respective signature is first checked against the clusters to see if there is a match and, if so, it may not be necessary to add the signature to the cluster or clusters. Rather, it may be sufficient to simply associate the MMDE with the identified cluster or clusters. However, in some cases where additional refinement of the concept structure is possible, the signature may be added, or at times even replace, one or more of the existing signatures in the reduced cluster. If no match is found, then the process of inter-matching and clustering may take place.

Figure 5:
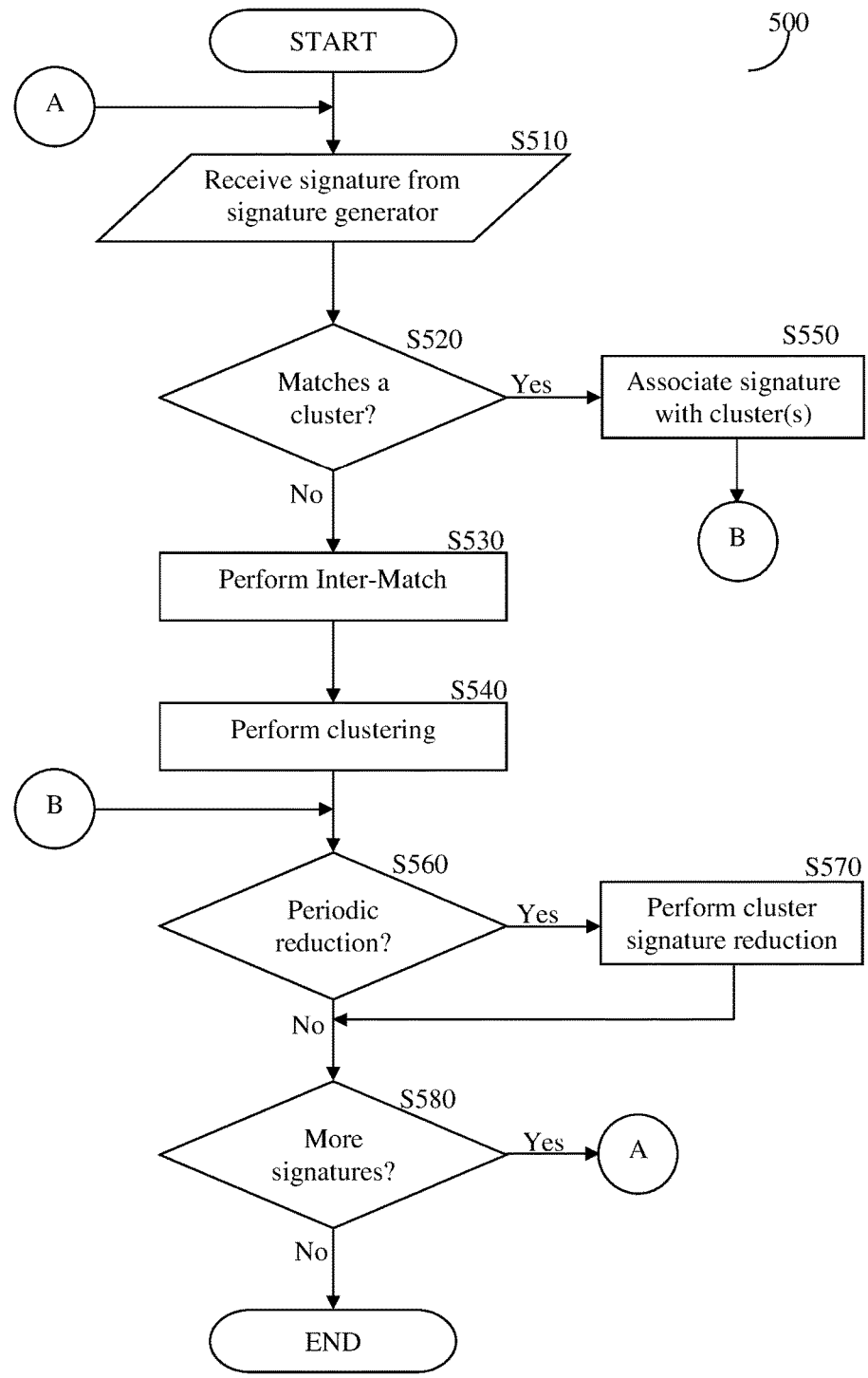
FIG. 5 is a flowchart illustrating the operation of the clustering processor in accordance with an embodiment.

FIG. 5 depicts an example flowchart 500 of the operation of the CP 130. In S510, a signature of a MMDE is received, for example from the SG 120. In S520, it is checked whether the signature matches one or more existing clusters and, if so, execution continues with S550; otherwise, execution continues with S530. In S530, an inter-match between a plurality of signatures previously received by the DCC system 100 is performed, for example in accordance with the principles of the '489 application. As may be necessary, the DB 150 may be used to store results or intermediate results. However, other memory elements may be used. In S540, a clustering process takes place, for example in accordance with the principles of the '489 application. As may be necessary, the DB 150 may be used to store results or intermediate results. However, other memory elements may be used.

In S550, the signature identified as matching one or more existing clusters is associated with the existing cluster(s). In S560, it is checked whether a periodic cluster reduction is to be performed and, if so, execution continues with S570; otherwise, execution continues with S580. In S570, the cluster reduction process is performed. Specifically, the purpose of the operation is to ensure that the minimum number of signatures that still identify all of the MMDEs that are associated with the signature reduced cluster (SRC) remain in the cluster. This can be performed, for example, by attempting to match the signatures of each of the MMDEs associated with the SRC having one or more signatures removed therefrom. In one embodiment, the process of cluster reduction for the purpose of generating SRCs is performed in parallel and independently of the process described herein above. In such a case, after either S540 or S550, the operation of S580 takes place. In S580, it is checked whether there are additional signatures to be processed and, if so, execution continues with S510; otherwise, execution terminates. SRCs may be stored in a memory, such as the DB 150, for the purpose of being used by other elements included in the DCC system 100.

The CG 140 performs two tasks: it associates metadata to the SRCs provided by the CP 130, and it associates between similar clusters based on commonality of metadata. Example methods for associating metadata with MMDEs is described in U.S. patent application Ser. No. 12/348,888, entitled "Methods for Identifying Relevant Metadata for Multimedia Data of a Large-Scale Matching System", filed on Jan. 5, 2009, assigned to common assignee (the "'888 application"), and which is hereby incorporated by reference for all that it contains. One embodiment of the '888 application includes a method for identifying and associating metadata to input MMDEs. The method comprises comparing an input first MMDE to at least a second MMDE; collecting metadata of at least the second MMDE when a match is found between the first MMDE and at least the second MMDE; associating at least a subset of the collected metadata to the first MMDE; and storing the first MMDE and the associated metadata in a storage.

Another embodiment of the '888 application includes a system for collecting metadata for a first MMDE. The system comprises a plurality of computational cores enabled to receive the first MMDE, each core having properties found to be statistically independent of each other core, each generates responsive to the first MMDE a first signature element and a second signature element, the first signature element being a robust signature; a storage unit for storing at least a second MMDE, metadata associated with the second MMDE, and at least one of a first signature and a second signature associated with the second MMDE, the first signature being a robust signature; and a comparison unit for comparing signatures of MMDEs coupled to the plurality of computational cores and further coupled to the storage unit for the purpose of determining matches between multimedia data elements; wherein responsive to receiving the first MMDE the plurality of computational cores generate a respective first signature of said first MMDE and/or a second signature of said first MMDE, for the purpose of determining a match with at least a second MMDE stored in the storage and associating metadata associated with the at least second MMDE with the first MMDE.

Similar processes to match metadata with a MMDE or signatures thereof may be used in accordance with the disclosed embodiments. However, these should be viewed only as example implementations, and other methods of operation may be used with respect to the DCC system 100 without departing from the scope of the disclosed embodiments. Accordingly, each SRC is associated with metadata which is the combination of the metadata associated with each of the signatures that are included in the respective SRC, preferably without repetition of metadata. A plurality of SRCs having metadata may now be associated to each other based on the metadata and/or partial match of signatures. For example, and without limitation, if the metadata of a first SRC and the metadata of a second SRC overlap more than a predetermined threshold level, for example 50% of the metadata match, they may be considered associated clusters that form a concept structure. Similarly, a second threshold level can be used to determine if there is an association between two SRCs where at least a number of signatures above the second threshold are identified as a match with another SRC. From a practical example, one may want to consider the concept of Abraham Lincoln where images of the late President and features thereof, appear in a large variety of photographs, drawings, paintings, sculptures and more and are associated as a concept structure of the concept "Abraham Lincoln". Each concept structure may be then stored in memory, for example, in the DB 150 for further use.

Figure 6:
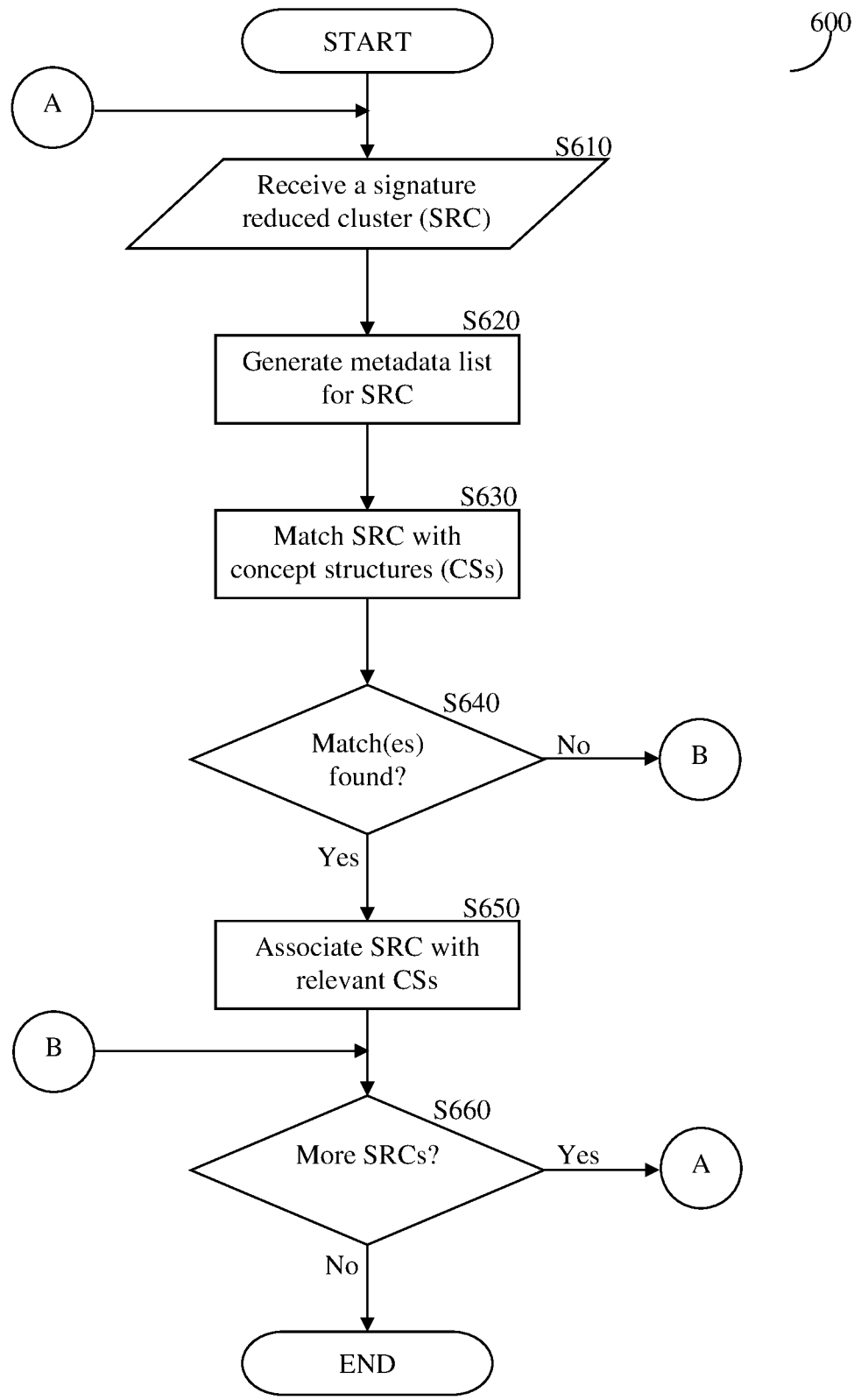
FIG. 6 is a flowchart illustrating the operation of the concept generator in accordance with an embodiment.

FIG. 6 shows an example flowchart 600 of the operation of the CG 140 realized in accordance with the principles of the disclosure. In S610, the CG 140 receives a SRC from either the CP 130 or by accessing memory such as, for example, the DB 150. In S620, metadata are generated for the signatures of the SRC, for example in accordance with the principles described hereinabove. A list of the metadata is created for the SRC preferably with no metadata duplication. In one embodiment, the commonality of metadata is used to signify the strength of the metadata with respect to a signature and/or the SRC, i.e., a higher number of metadata repetitions is of more importance to the SRC than a lower number of repetitions. Furthermore, in one embodiment, a threshold may be used to remove those metadata that have a significantly low rate of repetition as not being representative of the SRC.

In S630, the SRC is matched to previously generated SRCs to attempt to find various matches, as described, for example, hereinabove in more detail. In S640, it is checked if at least one match was found and, if so, execution continues with S650; otherwise, execution continues with S660. In S650, the SRC is associated with one or more of the concept structures to which the SRC has been shown to match. In S660, it is checked whether additional SRCs are to be received and, if so, execution continues with S610; otherwise, execution terminates.

A person skilled in the art would now appreciate the advantages of the DCC system 100 and methods thereof. The DCC system 100 is capable of creating, automatically and in an unsupervised fashion, concept structures of a wide variety of MMDEs. When checking a new MMDE, it may be checked against the concept structures stored, for example, in the DB 150 and, upon detection of a match, providing the concept information about the MMDE. With the number of concept structures being significantly lower than the number of MMDEs, the solution is cost effective and scalable for the purpose of identification of content of a MMDE.

The embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What we claim is:

1. A method for generating concept structures based on a plurality of multimedia data elements (MMDEs), comprising:
generating, based on the plurality of MMDEs, a plurality of patches, wherein each patch is at least a portion of one of the MMDEs;
generating, based on the plurality of patches, a plurality of signatures for the plurality of MMDEs;
clustering the generated plurality of signatures into a plurality of clusters;
generating metadata for each of the plurality of clusters; and
creating, based on the plurality of clusters, at least one concept structure, wherein each concept structure includes at least one of the plurality of clusters and the metadata associated with the at least one of the plurality of clusters.

2. The method of claim 1, wherein generating the plurality of patches further comprises:
creating, for each MMDE, at least one patch; and
determining, for each created patch, an entropy of the patch, the entropy of each patch representing an amount of interesting information in the patch, wherein the generated plurality of patches includes each created patch having an entropy above a predetermined threshold.

3. The method of claim 2, wherein the entropy of each patch is determined based on at least one of: at least one sharp edge of the patch, at least one corner of the patch, and at least one border of the patch.

4. The method of claim 2, wherein the entropy of each created patch is determined using a plurality of statistically independent computational cores, wherein the properties of each computational core are set independently of the properties of others of the computational cores.

5. The method of claim 2, wherein each patch has a random size and a random position within the respective MMDE.

6. The method of claim 1, wherein each of the plurality of clusters is a signature reduced cluster (SRC), wherein clustering the generated plurality of signatures further comprises:
   determining whether a number of generated patches is above a predetermined threshold; and
   creating a plurality of SRCs, when it is determined that the number of generated patches is above the predetermined threshold.

7. The method of claim 6, wherein creating the plurality of signature reduced clusters further comprises:
   reducing a number of signatures in each SRC so that each SRC includes only signatures that uniquely identify the SRC, wherein reducing the number of signatures in each SRC further comprises, for each signature in the SRC:
   removing the signature from the SRC;
   determining if MMDEs associated with the SRC can be recognized using the removed signature SRC; and
   adding the removed signature to the SRC, when it is determined that MMDEs associated with the SRC cannot be recognized using the removed signature SRC.

8. The method of claim 6, wherein creating the plurality of SRCs further comprises:
   comparing each signature to a plurality of existing clusters to determine whether the signature matches at least one of the existing clusters; and
   associating each matching signature with the respective matching at least one of the existing clusters.

9. The method of claim 1, further comprising:
   for each cluster, comparing the metadata generated for the cluster to metadata of a plurality of existing clusters to determine whether the metadata of the cluster matches the metadata of at least one of the existing clusters above a predetermined threshold; and
   for each cluster having metadata matching at least one of the existing clusters above a predetermined threshold, associating the cluster with the at least one of the existing clusters to form a concept structure.

10. A non-transitory computer readable medium having stored thereon instructions for causing one or more processing units to perform a process, the process comprising:
   generating, based on the plurality of MMDEs, a plurality of patches, wherein each patch is at least a portion of one of the MMDEs;
   generating, based on the plurality of patches, a plurality of signatures for the plurality of MMDEs;
   clustering the generated plurality of signatures into a plurality of clusters; and
   creating, based on the plurality of clusters, at least one concept structure, wherein each concept structure includes at least one of the plurality of clusters and the metadata associated with the at least one of the plurality of clusters.

11. A system for generating concept structures from signature reduced clusters (SRCs), comprising:

a processing circuitry; and
a memory, the memory containing instructions that, when executed by the processing circuitry, configure the system to:
   generate, based on the plurality of MMDEs, a plurality of patches, wherein each patch is at least a portion of one of the MMDEs;
   generate, based on the plurality of patches, a plurality of signatures for the plurality of MMDEs;
   cluster the generated plurality of signatures into a plurality of clusters;
   generate metadata for each of the plurality of clusters; and
   create, based on the plurality of clusters, at least one concept structure, wherein each concept structure includes at least one of the plurality of clusters and the metadata associated with the at least one of the plurality of clusters.

12. The system of claim 11, wherein the system is further configured to:
   create, for each MMDE, at least one patch; and
   determine, for each created patch, an entropy of the patch, the entropy of each patch representing an amount of interesting information in the patch, wherein the generated plurality of patches includes each created patch having an entropy above a predetermined threshold.

13. The system of claim 12, wherein the entropy of each patch is determined based on at least one of: at least one sharp edge of the patch, at least one corner of the patch, and at least one border of the patch.

14. The system of claim 12, wherein the entropy of each created patch is determined using a plurality of statistically independent computational cores, wherein the properties of each computational core are set independently of the properties of others of the computational cores.

15. The system of claim 12, wherein each patch has a random size and a random position within the respective MMDE.

16. The system of claim 11, wherein each of the plurality of clusters is a signature reduced cluster (SRC), wherein the system is further configured to:
   determine whether a number of generated patches is above a predetermined threshold; and
   create a plurality of SRCs, when it is determined that the number of generated patches is above the predetermined threshold.

17. The system of claim 16, wherein the system is further configured to:
   reduce a number of signatures in each SRC so that each SRC includes only signatures that uniquely identify the SRC, wherein reducing the number of signatures in each SRC further includes, for each signature in the SRC: removing the signature from the SRC, determining if MMDEs associated with the SRC can be recognized using the removed signature SRC, and adding the removed signature to the SRC, when it is determined that MMDEs associated with the SRC cannot be recognized using the removed signature SRC.

18. The system of claim 16, wherein the system is further configured to:
   compare each signature to a plurality of existing clusters to determine whether the signature matches at least one of the existing clusters; and
   associate each matching signature with the respective matching at least one of the existing clusters.

19. The system of claim 11, wherein the system is further configured to:

for each cluster, compare the metadata generated for the cluster to metadata of a plurality of existing clusters to determine whether the metadata of the cluster matches the metadata of at least one of the existing clusters above a predetermined threshold; and for each cluster having metadata matching at least one of the existing clusters above a predetermined threshold, associate the cluster with the at least one of the existing clusters to form a concept structure.

* * * * *